United States Patent
Rojas (10) Patent No.: US 6,249,571 B1
(45) Date of Patent: Jun. 19, 2001

(54) TELEMANAGEMENT SYSTEM WITH MODULAR FEATURES AND DATABASE SYNCHRONIZATION

(75) Inventor: Michael J. Rojas, North Canton, OH (US)

(73) Assignee: North Coast Logic, Inc., Canton, OH (US)

( * ) Notice: Subject to any disclaimer, the term of this patent is extended or adjusted under 35 U.S.C. 154(b) by 0 days.

(21) Appl. No.: 09/183,414

(22) Filed: Oct. 30, 1998

(51) Int. Cl.[7] .............................. H04M 15/00; H04M 1/00
(52) U.S. Cl. ........................ 379/112; 379/112; 379/113; 379/133; 379/157; 379/165
(58) Field of Search ..................... 379/112, 113, 379/114, 115, 116, 133, 134, 156, 157, 164, 165

(56) References Cited

U.S. PATENT DOCUMENTS

| | | | |
|---|---|---|---|
| 4,464,543 | * | 8/1984 | Kline et al. ......................... 179/18 R |
| 4,525,601 | * | 6/1985 | Barnich et al. ........................ 179/11 |
| 4,881,166 | | 11/1989 | Thompson et al. .................. 364/200 |
| 5,048,079 | * | 9/1991 | Harrington et al. ................. 379/112 |
| 5,333,183 | * | 7/1994 | Herbert ................................ 379/112 |
| 5,341,498 | | 8/1994 | Connor et al. ....................... 395/600 |
| 5,506,894 | * | 4/1996 | Billings et al. ...................... 379/127 |
| 5,509,056 | * | 4/1996 | Ericsson et al. ..................... 379/144 |
| 5,546,580 | | 8/1996 | Seliger et al. ....................... 395/600 |
| 5,592,473 | * | 1/1997 | Matern et al. ....................... 379/201 |
| 5,652,787 | | 7/1997 | O'Kelly ............................... 379/112 |
| 5,689,550 | | 11/1997 | Garson et al. ......................... 379/89 |
| 5,751,706 | * | 5/1998 | Land et al. .......................... 379/114 |
| 5,754,306 | * | 5/1998 | Taylor et al. ........................ 358/400 |
| 5,761,432 | | 6/1998 | Bergholm et al. ............. 395/200.56 |
| 5,799,073 | * | 8/1998 | Fleischer et al. .................... 379/113 |
| 5,859,901 | * | 1/1999 | Brendzel et al. .................... 379/114 |
| 5,873,030 | * | 2/1999 | Mechling et al. ................... 455/408 |
| 5,875,242 | * | 2/1999 | Glaser et al. ........................ 379/207 |
| 5,892,821 | * | 4/1999 | Turner et al. ........................ 379/220 |
| 5,926,530 | * | 7/1999 | Schlossman et al. ............... 379/117 |
| 5,974,133 | * | 10/1999 | Fleischer, III et al. ............. 379/230 |
| 5,991,383 | * | 11/1999 | Kucmerowski et al. ........... 379/142 |
| B1 5,187,787 | | 5/1996 | Skeen et al. ......................... 395/600 |

* cited by examiner

Primary Examiner—Stella Woo
Assistant Examiner—Quoc D. Tran
(74) Attorney, Agent, or Firm—Scully, Scott, Murphy & Presser (57) ABSTRACT

A computer usable medium having software embodied therein for managing at least one telephone system having a PBX switch and database and at least one adjunct system and database. The software includes a method for creating and managing a master database for maintaining a copy of information contained in each PBX and adjunct system database, and collecting SMDR data from the PBX switch and converting the data to CDR data based on the information in the master database. Also provided is a storage device embodying a program of instructions to perform method steps for converting a record of a phone call collected from a PBX switch to 10 digits.

22 Claims, 2 Drawing Sheets

TELEMANAGEMENT SYSTEM WITH MODULAR FEATURES AND DATABASE SYNCHRONIZATION

BACKGROUND OF THE INVENTION

1. Field of the Invention

This invention relates to the management of telephone systems and in particular to the efficient integration of components of a telephone system for ease of use.

2. Description of Prior Art

As technology continues to march forward year after year, the telecommunications professional is faced with an ever increasingly complex task of dealing with these systems. In the early days (circa 1982–85), a corporation's telecommunications infrastructure typically consisted of only a single phone system using a single Public Broadcast Exchange (PBX). When a new employee came aboard, maintenance on this system was relatively simple—a few commands was all that was required to add a new phone.

However, as corporations grew, so did their phone systems. Soon, companies had multiple systems scattered among several sites. When an employee moved from one site to another more commands were needed to accomplish this task—a "delete" on the old system and an "add" on the new system.

Telecommunication professionals invented new ways in dealing with these changes. By using change requisition forms and control sheets, the work could be managed and processed in bulk—all manually. This technique worked—for a while.

For years, the only way to get reports on a corporation's phone activity was to wait for the bill from the phone company. However, soon the owners of these systems realized they too could track phone activity by using special data ports in the PBX. These ports became known as Station Message Detail Records or SMDR. The concept was simple—every time a phone call was completed, the PBX would transmit a single SMDR data packet. These data packets could be collected, stored on a computer, and detailed reports could be generated. A new system known as Call Accounting was introduced to meet this requirement.

However, Call Accounting systems also required their own data management. When a new employee came aboard, the telecommunications professional had to add a data record into the Phone System and into the Call Accounting system as well. When an employee moved, multiple records and multiple systems needed updating. But technology did not stop there. Soon corporations began replacing individual telephone answering devices with more economical Voice Mail Systems (VMS). These systems could literally replace thousands of individual answering devices with a single machine. However, these systems needed data management as well.

With the introduction of Computer-Based Phone Directories, Human Resource Systems, Credit Card/Authorization Code Systems, Emergency 911 Systems, Service Billing Systems, Network Access Devices, and many others, the telecommunications professional was soon faced with updating as many as 10 (or more) separate systems with the exact same information. Even with forms and procedures, this task was difficult at best and very error prone. Obviously, a better method was needed. The professional had to wait until around the early 90's before solutions were attempted to address this problem. The first attempt at solving this problem was known as product integration. The concept was simple, a telecommunications vendor would produce a product that would combine all of the needed features into a single package. By having all of the telecommunication systems in a single platform, software could be engineered to share a single database. This would allow a single data management screen to be presented to the telecommunication professional. From this screen, all products could be updated at once. Soon, products began appearing on the market that were Call Accounting+Voice Mail+Phone Directory (or the like) all in one software package. North Coast Logic produced two generations of such packages (VSX and ARENIX). These packages worked in many environments and are still in use today.

However, they didn't work in all situations. One problem was many corporations wanted multi-vendor solutions. The telecommunications professional did not want to be dependent on single vendor for the entire communications infrastructure. They wanted to shop and get the best value. They also soon realized that a single vendor could not be an expert in every industry. Another problem was that these integrated products typically consisted of a single hardware platform. All applications ran on a single machine. If that machine failed, the entire infrastructure was brought down. Even though many vendors tried to compensate for this by using highly reliable (and redundant) equipment, the solution still fell short of relieving the mounting workload on the professional.

The problem with a single database design became evident by the database technology itself. No single database technology fills every application requirement. Each vendor makes database technology decisions based on their unique system framework. For example, a Call Accounting system may be able to use any off the shelf Database Management System (DBMS), but a Voice Mail System needs a specialized data streaming system that is able to store and retrieve recorded voice data at 4–8 kb per second. A Phone System database is usually completely stored in memory and made up of a series of jump tables organized in a tree-like fashion. This allows the system to traverse the database as each digit is dialed. No off the shelf database product would fit all of these unique requirements.

In addition to the problems described above, an even worse issue exists with these early integrated systems. In a typical telecommunications environment, each of these systems have their own data entry terminal. This means that if the telecommunications professional does not use the integrated data management screen to do updates, the various databases in each system will become out-of-sync with each other. This is known as the multiple-entry problem.

For example, suppose that the telecommunications professional updates the phone system via its own data entry terminal, but updates the Call Accounting and Phone Directory via the integrated data management screen. In this scenario, it is possible that the changes made directly to the PBX may be lost or be left different than those in the integrated product. The two databases are out-of-sync.

Although it is tempting to mandate that all data entry is done via the integrated screen, in practice this is seldom the case. In many situations, work is required to be performed on a specific system and may require the use of a special field not accessible via the integrated screen. Even if all features could be moved to the integrated data management screen, the user interface would be so unwieldy that no user could navigate it.

SUMMARY OF THE INVENTION

The system of the present invention is an integrated suite of system control and application software modules used to manage one or more telephone systems. In addition to controlling commonly used PBX telephone systems, the invention controls adjunct systems such as voice mail systems and 911 emergency systems. The system of the invention ties its application modules and system control modules together through a single point of entry and a synchronized database. Information entered through one module is automatically accessible by all other modules.

Repeated data entry and multiple system management are eliminated for client applications such as call accounting, cabling, assets, work orders, trouble tickets, traffic analysis, authorization codes, bill reconciliation, billing and other applications. The system ties its modules together across a LAN or operates as a stand-alone system. Operators can use networked computers for number lookup on its interactive directory or for information distribution via its message center.

The modular design of the telemanagement system of the present invention allows modules to be easily added to suit a company's growing needs. As technology advances, the system provides seamless integration between the PBX, the voice mail, and each existing, or future module.

Second, the system easily synchronizes several databases, allowing them to operate as one. It is impractical to manage multiple applications and devices with a single database. Technicians are comfortable with PBX and voice mail programming. Requiring them to relearn system programming through a new interface can jeopardize system stability. The system of the present invention reaches out to the PBX and the voice mail databases and adjusts them by reading from or writing to them. Users can synchronize records one at a time or all together. A reconciliation feature compares databases and makes changes where deemed appropriate.

The client software program modules may be divided into five categories:

1. Interface Management. This is the basic minimum system with a system manager and call accounting. A graphical single user interface is included that incorporates all graphical user interfaces of all program modules of the invention. The manager controls the collection and costing of incoming and outgoing telephone calls, and creates predefined and user created reports on the telephone calls. The reports may be printed on a number of printers which may be connected to the network or locally to individual computers.
2. System Management. Automate common telemanagement programming and maintenance tasks, and track and schedule equipment requests and repairs;
3. Facilities Management. These modules track telephone cables, track telephony assets, bill for calls, services, and equipment and perform bill reconciliation to compare incurred charges from service provider;
4. User Management. These modules manually receive, forward and record telephone calls, and provide an interactive directory e.g., internal enhanced yellow pages; and
5. Network Management. These modules authorize calls and to analyze traffic.

The server programs include a program for collecting and costing calls from the PBX and an interprocess communication program. Also included are system control modules to control Maintenance Administration Terminal functions of PBXs, setup and monitor voice mail systems, and control 911 emergency system databases.

The system of the present invention may be embodied in a single computer readable medium such as a floppy disk or CD ROM for stand alone use. Alternatively, server programs are provided on one computer readable medium and the client program and modules are provided on a second computer readable medium.

In the stand alone system the system of the present invention is embodied in an article of manufacture comprising computer readable program code means for creating and managing a master database for maintaining a copy of information contained in each PBX and adjunct system database; means for collecting SMDR data from the PBX switch and converting the data to CDR data based on the information in the master database; means for generating a plurality of call accounting reports based on the CDR data and the information in the master database; means for generating a plurality of call accounting queries based on the CDR data and the information in the database; means for providing a single user interface for entering data into the master database and the PBX and adjunct system databases, and for requesting call accounting reports and queries; means for processing communications between the master database, the PBX database, the adjunct system database through the single user interface; and means for synchronizing the entry of the same data into each of the master database and the PBX and adjunct system databases through the single user interface.

The program code means further includes means for managing PBX switch Maintenance and Administration Terminal functions from the single user interface; and means for managing voice mail system functions from the single user interface. The computer readable program code means further includes one or more computer readable program code modules, each of the modules providing a client application telemanagement function.

In a client/server system, the system of the present invention is embodied in an article of manufacture wherein the server computer readable program code comprises means for creating and managing a master database for maintaining a copy of information contained in the PBX and adjunct system databases; means for collecting SMDR data from the PBX switch and converting the data to CDR data based on the information in the master database; and means for processing communications between the master database, the PBX database, the adjunct system database and the client computer readable program code means.

The client computer readable program code comprises means for providing a single user interface for entering data into the master database and the PBX and adjunct system databases, and for requesting call accounting reports and queries; means for generating a plurality of call accounting reports based on the CDR data and the information in the master database; means for generating a plurality of call accounting queries based on the CDR data and the information in the master database; and means for synchronizing the entry of the same data into each of the master database and the PBX and adjunct system databases through the single user interface.

In addition, the collection program is embodied in a program storage device readable by a machine, tangibly embodying a program of instructions executable by the machine to perform method steps for converting SMDR data collected from a PBX switch to CDR data. The method steps include:

checking if the format of the SMDR data is correct;
checking if the PBX switch is a listed switch;
checking for a valid billing range, switch record, facility and cost definition;

checking the number of digits of the SMDR data;

checking whether to store the SMDR data;

costing stored SMDR data for creating CDR data;

checking for a user name for the SMDR data; and creating a CDR data file matching the CDR data to the user name.

The collection program also includes a program storage device readable by a machine, tangibly embodying a program of instructions executable by the machine to perform method steps for converting a record of a phone call collected from a PBX switch to 10 digits. The method steps include:

detecting and stripping access codes;

detecting and tagging x11 calls;

detecting and stripping common carrier codes;

detecting and tagging international calls;

detecting and tagging operator calls;

detecting long distance calls and converting the calls to 10 digits; and detecting local calls and converting the calls to 10 digits.

DETAILED DESCRIPTION OF THE INVENTION

Figure 1:
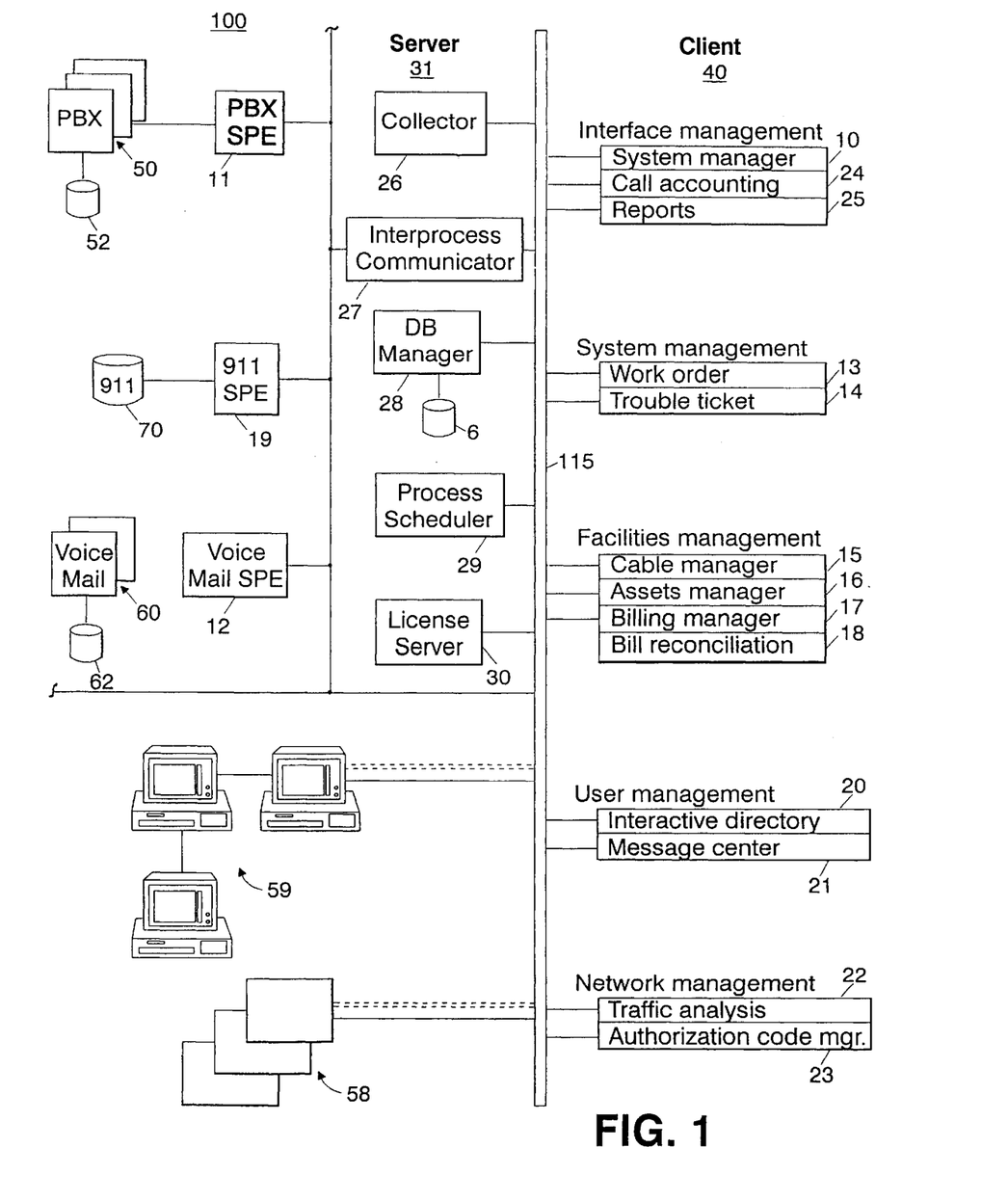
FIG. 1 is a block diagram representing the interconnection of various software programs and computer peripherals.

FIG. 1 shows an embodiment of the invention where the server/client software of the inventive system 100 is comprised of programs 10 through 30 connected to and communicating through a network 115. A server portion 31 of the system 100 remains running during all phases of operation. The software of the server 31 includes a collector program 26 to collect Station Message Detail Records (SMDR) directly from the modem or a serial port of the server computer 31 to which the PBX switch equipment 50 is connected. The collector program costs SMDR data and files a Call Detail Record (CDR) so that stored information can be later provided to the users.

An interprocess communicator program 27 of the server 31 is used for all communications between programs 10 through 30 and the PBX systems 50 and the adjunct systems, which include voice mail systems 60 and 911 emergency system database 70. It operates like a post office by forwarding all messages from the sender to the receiver and returning responses. System manager modules 11, 12 and 19 control the functions of the PBX, voice mail and 911 systems, respectively, through the interprocess communicator 27.

Server 31 also includes a process scheduler program 29 and a license server program 30. Process scheduler 29 operates like an alarm clock, staring processes, such as reports when they are scheduled to run. This program is running on the server 31 when the telemanagement system is operating. License server 30 is a security program on the server 31 that prohibits usage beyond what has been licensed by the user. This program keeps track of the number of clients using the system, the modules licensed, and the instance of each module. It interacts with the security key on the parallel port and the application on each client to allow or disallow access based licensed purchased and what is currently running.

The server 31 also includes a database manager program 28 and a master database 6. The data management of the telemanagement system 100 may be performed by Oracle software, with Borland Database Engine interfacing between applications and the Oracle software.

System 100 synchronizes the master database 6, with external databases 52, 62, 70, for PBX, voice mail and 911 emergency directory, respectively. The synchronization allows the system to operate as if there was one database. Each program 10 through 30 is designed to operate using the synchronized database 6. System 100 learns from one database and teaches the other, operating as though there is only one database. Information is entered into the database 6 only once and made available to all programs 10 through 30. During the system set up, the master database 6 may be automatically populated through synchronizing of databases, i.e., using the contents of one database to populate another database. Default information may often be used to fill in fields and further reduce entry time.

The reverse is also true, instead of actively managing multiple systems by entering changes into each telemanagement application, information is shared between PBX systems 50, Voice mail systems 60, and the telemanagement system 100, and databases 6, 52, 62, are automatically updated with each move, add, or change. Therefore, any change made in one system 50, 60, 100, is immediately learned by all others.

The database synchronization is the foundation for the single point of entry management feature. Single point of entry eliminates the need to actively manage multiple systems. User interfaces are dynamically generated and are designed for storing data in any of the various systems. Details of the single point of entry feature are provided in copending U.S. patent application Ser. No. 09/183,407, filed concurrently herewith by the same inventor and assigned to the same assignee as the present application, the entire application of which is hereby incorporated by reference herein.

Figure 2:
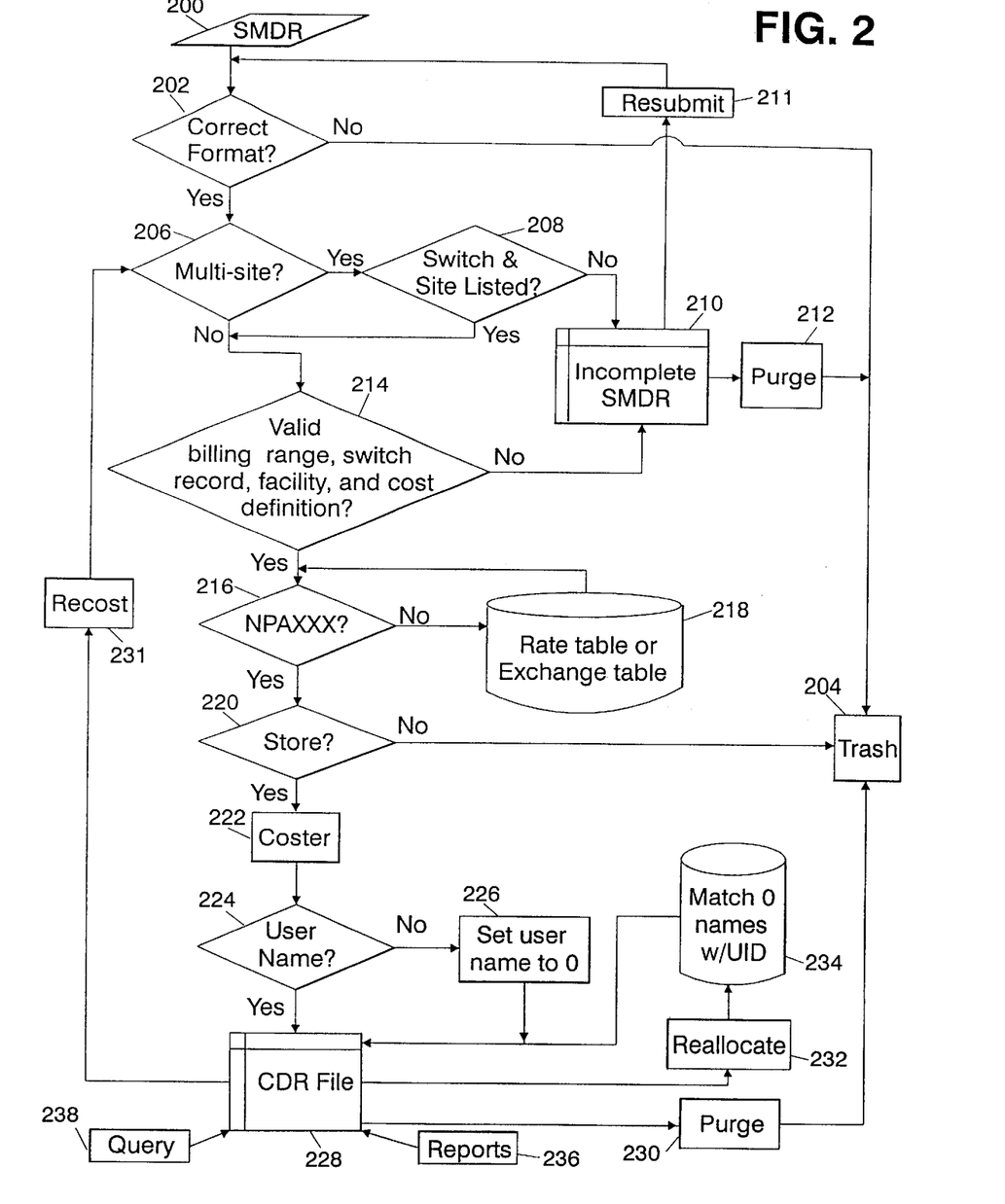
FIG. 2 is a flow diagram of a method for creating a CDR file from a SMDR file.

Returning now to the collector program 26, the main function of which is to collect the incoming SMDR and store it as a CDR. FIG. 2 is a flow chart for this operation. An SMDR 200 is gathered and in decision block 202 the format is checked. If the format is incorrect, the record is trashed in trash bin 204. If the format is correct, in decision block 206, the determination is made whether it is a multi-site or single site system. If the answer is yes, in decision block 208 it is determined whether the switch and site are listed. If the answer is no, block 210 determines that there is an incomplete SMDR and the record is either purged 212 and sent to trash 204 or resubmitted at 211. If the answer to decision block 208 is yes, or if the answer to decision block 206 is no, then in decision block 214 it is determined whether a valid billing range, switch record, facility and cost definition are available.

The billing range classifies the originator of the call by category. This allows different rates to be used for different categories of callers. The switch record identifies which PBX switch the call originated from. The facility identifies the type of carrier used for the call, such as local trunk lines or various long distance trunk lines. The cost definition is the cost parameters determined from the above information for costing the call.

If the answer at decision block 214 is no, the record is sent to block 210 where the user has the opportunity to correct and resubmit the record. If the answer is yes, decision block 216 checks if the Dialed Number in the correct format:

NPA-NXX? (where NPA stands for Numbering Plan Authority, commonly known as area code, followed by NXX which means Network Exchange or simply exchange). The decision block determines if the dialed number is missing important information (such as area code). If so, retrieve that data from the Exchange Table or Rate Table 218. This is possible because local calls typically are not dialed with the leading 3-digit area code. To cost a call, a full 3-digit area code+3 digits of the exchange are required. If the call is international, the area code is 011 and the next 3 digits are the country code-but in either case, a total of 6 digits are required. The corrected number is returned back to decision block 216. If the answer at block 216 is yes, the collector determines whether or not to store the record at decision block 220. If the answer is no, the record is trashed at 204. If yes, the coster 222 determines the cost of the call and then decision block 224 determines whether a user name is present. If no, block 226 sets the user name to 0 and then a CDR file is created in block 228. If the user name is available, then a CDR file is created with that user name at box 228. These CDR files can be purged at 230, reallocated at 232 or recosted at 231. If reallocated, database 234 is used to match the zero names with the user identification. Report request 236 and query 238 may then be implemented using the CDR files created.

When the Collector gathers SMDR from the switch, it pulls the dialed phone number from this code and converts it to something the system software can use. Collector tries to convert the dialed number to exactly 10 digits (NPA-NXX-XXXX) by using the logic below in the order it is listed.

(1) Strip access codes. Collector strips the longest matching access code for that facility. This is usually a 9.

(2) Detect 411, 611, 711, and 911 calls. If only three digits remain, and they are one of these recognized combinations, Collector stops processing and tags the call as information or emergency.

(3) Strip OCC (other common carrier) codes. If there are more than eleven digits remaining, Collector looks for an OCC using this method: If the first three digits are 101, then the first seven digits are stripped from the number. If this is not true and the first two digits are 10, then Collector strips the first five digits. These are different forms of OCC codes. If Collector finds either type of OCC code in its Equal Access Code table, and the OCC has an authorization code, then it also strips the authcode.

(4) Detect international calls. If the first three digits are 011, the call is international. Collector tags the call and stops processing.

(5) Detect operator calls. If the first digit is 0, Collector checks the following. If there are eleven digits, it strips the 0, tags the call as an operator call, and stops processing. If it finds eight digits, it strips the 0, prefixes the local area code, tags the call as an operator call, and stops processing. If the only digit is 0, it tags the call as an operator call and stops processing.

(6) Detect long distance calls. If the first digit is 1, Collector checks the following. If there are eleven digits, it strips the 1 and stops processing. If there are eight digits, it strips the 1, prefixes the local area code, and stops processing.

(7) Detect local calls. If the call length is seven digits, Collector prefixes the local area code, and stops processing.

After following this flow, Collector will have stripped, appended, and tagged numbers to create two types: tagged and others.

Tagged calls are special cases that are costed using the special numbers feature.

All other calls must contain at least six digits. The system assumes that the first three digits are area code, or NPA, and the next three are exchange, or NXX. Collector costs the calls by looking up these six digits in the costing definitions and rate tables. Following digits are used in other parts of the system, but not in costing.

Numbers containing less than six digits are tagged as free/invalid and costed at zero.

Users have the option of using rate tables or a costing algorithm for costing calls. Flat rates (such as ten cents a minute) and simple costing algorithms can be set up eliminating the need for rate tables. For multiple sites and more complex billing, one or more rate tables may be required.

The rate table screen offers information such as exchanges served, table creation date, type and size, and whether or not it supports releases of new area codes.

Costing definitions are provided for quickly creating and customizing all costing. A set of four tabbed screen prompts a user through the steps. Definitions can be created and assigned for use by different organizational levels. For either outgoing or incoming calls, the user defines whether the charges are time or rate based and then sets an optional flat fee or a minimum cost.

Using costing definitions and ranges, a variety of costing formulas can be created and assigned to different accounts. Each formula is named, assigned a rate table, and a standard carrier code (i.e. AT&T Megacom WATS). Costing can further be customized by defining whether the charges are time or rate based and by setting an optional flat fee or a minimum cost. Each type of call (i.e. local, IntraLATA, etc.) can be flagged for inclusion in the table rates.

Interface Management

The system manager program 10 is the main interface for all programs 10 through 30 of the telemanagement system 100. It provides access to all system functions and is the main program window through which all programs 10 through 30 may be controlled. Most programs 10 through 30 of the invention are activated and configured in a system manager program 10 control panel, which lists programs available to the user. When setting up programs, a user may define organizational levels and billing categories, enable or disable optional functions, and set system defaults. Once programs 10 through 30 are configured, the main window of the system manager program 10 becomes the focus of operation and can be accessed from any client terminal 59 located anywhere on the network 115.

The call accounting program 24 is a full-blown call accounting package. It's functions include collecting, processing, rating, verifying, and storing call usage data. The call accounting program 24 controls the collector program in order to capture station SMDR from the PBX switch 50, processes them according to information including extension owner, authorization or account code, and then costs calls according to either user defined rates or standard rate tables. The processed records may then be saved to a file or backed up to tape archives for later reporting. Reports may be printed to a terminal 59, to paper printer 58, or to a computer disk file in a variety of formats.

The call accounting program 24 has an ability through the collection program to flag special telephone numbers for individual treatment. A special telephone numbers screen allows an unlimited number of definitions including name, telephone number check pattern, secure printing, alarm generation, and cost override to be set up. Any sequence of characters, including wild cards e.g., pounds and stars may be used with the telephone number pattern function. Another feature is the ability to treat Other Common Carrier (OCC) codes (10XXX) differently according to user type. Each time an OCC code is dialed, the Manager module identifies it with a flag, and applies special cost routines, or records the call detail for later retrieval and review.

The reports program 25 is a feature of call accounting program 24, which allows pre-configured reports and queries to be used as is or to be reconfigured and renamed for custom use. The reports help users manage, control, and allocate costs to divisions, departments, accounts, and individuals. System abuse and use of unauthorized numbers may also be detected.

The reports program 25 has a query ability that provides instant on-screen information. Through screen-based questions, data from several different databases may be displayed. General query categories can be pre-set. Query categories may include pricing, call detail, traffic use, organizational users, and individual users. In addition reports can be predefined. Any predefined report may be modified or a new report format may be created from scratch. Modified or new reports may be named and saved for future use. Each time a report is run, the document may be previewed on-screen. A report may be scheduled to print weekly, monthly, bi-monthly, or every number of days. In addition, reports may be scheduled to print during off-hours.

System Management

The PBX program module 11 interfaces with the PBX system 50 by managing Maintenance and Administration Terminal (MAT) 51 functions. The PBX program 11 provides a Graphical User Interface (GUI) that allows the user to view a graphic of a PBX viewing screen from any terminal 59, anywhere on the network 115. After changes are made they are downloaded to the PBX system 50 to synchronize database 52 with database 6. The PBX program 11 provides a single point of entry between database 6, the PBX system 50 and the voice mail system 60.

The PBX graphic displays line and trunk cards with blinking lights on open ports. By selecting cards in the PBX graphic, free cards, cards in use, and card types for each slot, such as trunks, analog lines, digital lines, etc., will be shown. In addition, port and LEN numbers, program key functions, telephone preferences, can also be viewed from that screen and PBX administrative duties can be performed.

The voice mail program module 12 interfaces with the voice mail system 60, such as, the Octel Aria 1.2, Centigram system 6.x, or Active Voice (AD-40) and manages the voice mail system 60 features and functions from a stand-alone or networked computer. The voice mail program 12 provides a single point of entry between the database 6, PBX system 50, and the voice mail system 60. A GUI provided by the voice mail program 12 allows the user to assign mailboxes, set preferences, and accomplish other administrative duties from any terminal 59, anywhere on the network 115. After the changes are made they are downloaded to the voice mail system 60 to synchronize the database 62.

The work order program module 13 assists in the handling of administrative tasks. Automated functions of the work order program 13 streamline requests for service, such as PBX and voice mail changes, assignment and tracking of inventory and cable pairs, and automated integration. The capabilities of the work order program 13 include scheduling work to be performed, generating work orders, and tracking work order's progress. When a work order that affects cabling or inventory data is closed, the database 6 is automatically updated.

The trouble ticket program module 14 facilitates users in requesting equipment or technical repair. It logs trouble reports, assigns priority levels to each type of trouble, and tracks them to resolution. Trouble reports may be logged for problems including telephone extension and equipment failures, public access line failures, and telephone system generated alarms. The trouble ticket program 14 maintains warranty and maintenance histories and includes response times. Full reports based on the date and time a problem is reported, problem description, and who reported the problem may be printed. The trouble ticket program 14 integrates with the work order program 13, the asset manager program 16, the cable manager program 15, and the billing manager program 17 to update the necessary information on the existing problem in the database 6 and to provide capabilities for the full resolution of the existing problem.

Facilities Management

The cable manager program module 15 tracks cabling and facility design. Based on the TIA/EIA/ANSI 606 standard, it tracks cabling in both a graphical layout that may be customized to reflect individual facility and a spreadsheet-like database layout of all system data. A single drag and drop change in the GUI displayed on any terminal 59, can automatically perform a plurality of separate updates throughout the database 6. The cable manager program 15 tracks components including station outlets, jacks and risers, special circuits, dedicated non-switched connections, feeder cables, telephone company points of demarcation, and fiber optic networks.

The cable manager program 15 may assign devices including switch nodes and ports, frames, blocks, pairs, cross-connects, locations, and descriptions. Assignments may include telephone extension numbers with locations and jack numbers, jack and station wire identification, riser pairs, and the distribution cable.

The cable manager program 15 tracks the availability and assignment of cables including outside plant and inside plant cable pairs. In addition, it may also track connections including fiber optic distribution, coaxial cabling plant, leased lines, private lines, and "dry pair" connections.

The asset manager program module 16 keeps track of telephone system components as they are removed from the inventory and used as an asset. The entire inventory may be managed from within the system 100. The asset manager program 16 is linked to the billing manager program 17 establishing a facility to charge appropriate individuals and departments.

The billing manager program module 17 provides a way to charge different entities, e.g., a customer, a department, or a company for services including telephone calls and equipment. It is not a full-blown accounting system, but a subsystem that exports phone-related charges to the company's accounting package, which can be one of a number of third party, off the shelf products. Charges generated in the system manager program 10, the work order program 13, and the asset manager program 16 can be billed for.

The bill reconciliation program module 18 compares Telco/RBOC/OCC generated billing detail with the costed and filed system 100 reports. To run the bill reconciliation program 18, the billing data must be loaded and report ranges and call types to be compared must be given. Once completed, an exception report in the detail or the summary format is created. The matching parameters may include the dialed number, the destination, e.g., city/town, the date and the time, the trunk route used, the telephone extension/station ID, account number, the duration of call, and the cost of call.

User Management

The 911 program module 19 is an interface between the user database 6 and the Automatic Location Information (ALI) of local community. In the past, 911 calls were routed through a PBX, providing limited information to the crews responding to the emergency, preventing emergency vehicles from easily responding to the correct building, floor, or room. The 911 program 19 provides the emergency location information for users. It then updates the local telephone company's ALI database 70 accordingly.

The interactive directory program module 20 is an electronic phone book. For each user, the interactive directory program 20 lists extension numbers, fax numbers, emergency numbers, other telephone numbers, and e-mail addresses. When a system 100 operator needs to find information about an individual employee, the interactive directory program 20 may be searched by using criteria such as the last name, the telephone extension number, or the department. Abbreviated names in a sounds-like search may be used. Multiple telephone numbers for an employee or multiple employees per telephone number may be listed. The full database may be published while protecting confidential numbers or information covered by privacy acts. Telephone directories may be printed to any local or network printer 58.

The message center program module 21 eliminates the impersonal approach of voice mail and is an efficient way for attendants to take telephone messages. When a call is forwarded from the attendant, call information in the form of pop-up windows allows an operator to see who is being called. Messages which can be retrieved for reading, forwarded to e-mail, or printed, may be entered in this window. The system 100 database 6 may be downloaded to the message center program 21 to avoid duplicate data entry and assure up-to-date user information.

The message center program 21 updates and maintains the component of the database 6 which includes users, operator logics, buildings, and departments. It generates usage reports, allows the user to answer calls, take and retrieve messages, and look up information such as directory information, user availability status, and call handling information.

Network Management

The PBX traffic analysis program module 22 provides a graphic layout of a system 100 having a plurality of PBX systems 50. It provides a graph of call traffic between multiple PBX systems 50 and allows the user to zoom in on specific sections to assess the usage of a specific path in a specified time segments. The PBX traffic analysis program 22 accesses comprehensive system and network traffic statistics provided by PBX systems 50 and allows viewing and manipulating of that data in a manageable graphic format on any terminal 59. Utilities and reporting functions are provided for help in analyzing statistics of the present system 100 or possibilities of future requirements.

The authorization code manager program module 23 allows the user to manage and perform real time authorization code verification sometimes called PACs or PINs. Codes may be verified, added, deleted, changed, activated, and deactivated through a single screen from any terminal 59, anywhere on the network 115. Every time a call is made requiring authorization code verification, a message is sent from the originating PBX to the authorization code manager program 23, which can query the database 6 for verification in real-time and return an "accept" or "decline" reply.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

What is claimed is:

1. An article of manufacture comprising:
   a computer usable medium having computer readable program code means embodied therein for managing at least one telephone system having a PBX switch and database and at least one adjunct system and database, the computer readable program code comprising:
   computer readable program code means for creating and managing a master database for maintaining a copy of information contained in each PBX and adjunct system database;
   computer readable program code means for collecting Station Message Detail Records (SMDR) data from the PBX switch and converting the data to Call Detail Record (CDR) data based on the information in the master database, comprising the steps of:
   (a) checking if the format of the SMDR data is correct;
   (b) checking if the PBX switch is a listed switch;
   (c) checking for a valid billing range, switch record, facility and cost definition;
   (d) checking the number of digits of the SMDR data and if the number of digits is not equal to a predetermined number of digits, converting the number of digits to the predetermined number of digits;
   (e) checking whether to store the SMDR data based on information resulting from checking at least one of steps (a) to (g);
   (f) costing stored SMDR data for creating CDR data;
   (g) checking for a user name for the stored SMDR data; and
   (h) creating a CDR data file matching the CDR data to the user name;
   computer readable program code means for generating a plurality of call accounting reports based on the CDR data and the information in the master database;
   computer readable program code means for generating a plurality of call accounting queries based on the CDR data and the information in the database;
   computer readable program code means for providing a single user interface for entering data into the master database and the at least one PBX and adjunct system databases, and for requesting the call accounting reports and queries;
   computer readable program code means for processing communications between the master database, and the at least one PBX and adjunct system databases through the single user interface; and
   computer readable program code means for synchronizing the entry of the same data into each of the master database and the at least one PBX and adjunct system databases through the single user interface.

2. The article of manufacture of claim 1 wherein the computer readable program code means further includes means for managing PBX switch Maintenance and Administration Terminal functions from the single user interface.

3. The article of manufacture of claim 1 wherein the adjunct system is a voice mail system and database and the computer readable program code means further includes means for managing voice mail system functions from the single user interface.

4. The article of manufacture of claim 1 wherein the adjunct system is a 911 emergency system database and the computer readable program code means further includes means for managing the 911 system database from the single user interface.

5. The article of manufacture of claim 1 wherein the computer readable program code means further includes one or more computer readable program code modules, each of the modules providing a telemanagement function.

6. The article of manufacture of claim 5 wherein the modules include a module for automating telemanagement administrative tasks.

7. The article of manufacture of claim 5 wherein the modules include a module for tracking telephone system cabling and facility design.

8. The article of manufacture of claim 5 wherein the modules include a module for allowing a user to request telephone equipment or technical repair.

9. The article of manufacture of claim 5 wherein the modules include a module for tracking telephone system components being used in the telephone system.

10. The article of manufacture of claim 5 wherein the modules include a module for billing telephone calls, equipment and services.

11. The article of manufacture of claim 5 wherein the modules include a module for managing authorization code verification.

12. The article of manufacture of claim 5 wherein the modules include a module for interfacing the master database with a local 911 emergency phone system.

13. The article of manufacture of claim 5 wherein the modules include a module for providing a interactive directory of telecommunication numbers.

14. The article of manufacture of claim 5 wherein the modules include a module for managing the receipt and taking of messages.

15. The article of manufacture of claim 5 wherein the modules include a module for analyzing PBX traffic.

16. The article of manufacture of claim 5 wherein the modules include a module for reconciling a phone carrier bill with the CDR data.

17. A program storage device readable by a machine, tangibly embodying a program of instructions executable by the machine to perform method steps for converting Station Message Detail Records (SMDR) data collected from a PBX switch to Call Detail Record (CDR) data, said method steps comprising:

(a) checking if the format of the SMDR data is correct;

(b) checking if the PBX switch is a listed switch;

(c) checking for a valid billing range, switch record, facility and cost definition;

(d) checking the number of digits of the SMDR data and if the number of digits is not equal to a predetermined number of digits, converting the number of digits to the predetermined number of digits;

(e) checking whether to store the SMDR data based on information resulting from checking at least one of steps (a) to (g);

(f) costing stored SMDR data for creating CDR data;

(g) checking for a user name for the stored SMDR data; and (h) creating a CDR data file matching the CDR data to the user name.

18. A program storage device readable by a machine, tangibly embodying a program of instructions executable by the machine to perform method steps for converting a record of a phone call collected from a PBX switch to 10 digits, said method steps comprising:

(a) detecting and stripping access codes;

(b) detecting and tagging x11 calls;

(c) detecting and stripping common carrier codes;

(d) detecting and tagging international calls;

(e) detecting and tagging operator calls;

(f) detecting long distance calls and converting the calls to 10 digits; and (g) detecting local calls and converting the calls to 10 digits.

19. The program storage device of claim 18 wherein if after steps (a) and (b) there are more than 11 digits remaining, further including the steps of stripping the first 7 digits if the first 3 digits are 101 or if the first 3 digits are not 101, then stripping the first 5 digits.

20. The program storage device of claim 18 wherein step (e) includes the steps: if there are 11 digits, stripping the 0; and if there are 8 digits, stripping 0 and prefixing the local area code.

21. The program storage device of claim 18 wherein step (f) includes the steps of: if there are 11 digits, stripping the 1; and if there are 8 digits, stripping the 1 and prefixing the local area code.

22. The program storage device of claim 18 wherein step (g) includes the step of if there are 7 digits, prefixing the local area code.

* * * * *

UNITED STATES PATENT AND TRADEMARK OFFICE
CERTIFICATE OF CORRECTION

PATENT NO. : 6,249,571 B1
DATED : June 19, 2001
INVENTOR(S) : M.J. Rojas

Page 1 of 1

It is certified that error appears in the above-identified patent and that said Letters Patent is hereby corrected as shown below:

Title page,
Item [54], Title,
"A TELEMANAGEMENT SYSTEM WITH MODULAR FEATURES AND DATABASES SYNCHRONIZATION" should read -- TELEMANAGEMENT SYSTEM WITH SMDR DATA COLLECTION, SMDR DATA CONVERSION AND DATABASE SYNCHRONIZATION --

Signed and Sealed this

Thirtieth Day of April, 2002

Attest:

Attesting Officer

JAMES E. ROGAN
Director of the United States Patent and Trademark Office